3,347,686
ANTI-FOULING PAINT

Edward D. Weil, Lewiston, and Keith J. Smith, Lockport, N.Y., assignors to Hooker Chemical Corporation, Niagara Falls, N.Y., a corporation of New York
No Drawing. Original application Mar. 23, 1961, Ser. No. 97,771, now Patent No. 3,281,453. Divided and this application Nov. 30, 1965, Ser. No. 510,682
10 Claims. (Cl. 106—15)

This is a division of my copending application Ser. No. 97,771, filed Mar. 23, 1961, now Patent No. 3,281,453.

This invention concerns novel pentacyclic compositions of matter useful as toxicants and intermediates for organic synthesis. More particularly, this invention describes a new class of compounds, N-(decachloro-3-hydroxypentacyclo(5.3.0.0$^{2,6}$.0$^{4,10}$.0$^{5,9}$) decyl-3) amides, which because of their apparent toxicity or repulsion toward lower forms of marine life such as barnacles, function effective as marine fouling retardants. The scope of the present invention encompasses the compounds within the generic formula below (numbering of the positions is shown):

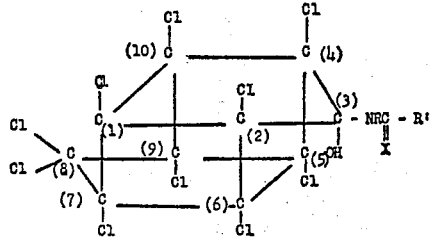

where R is a member selected from the group consisting of hydrogen, alkyl, substituted alkyl, aryl, substituted aryl, R' is a member selected from the group consisting of hydrogen, alkyl, substituted alkyl, aryl, substituted aryl, amino, substituted amino, alkoxy, and aryloxy, X is an element selected from the group consisting of sulfur and oxygen, oxygen being preferred for reasons of cost and, generally, stability.

The group R or R' may be of high molecular weight and either or both may in fact represent macromolecular chains; and the compositions of the invention may, therefore, be macromolecular (polymeric) substances as well as lower molecular weight substances.

For the sake of simplicity the below portion of the generic formula given previously will be referred to as $C_{10}Cl_{10}(OH)$.

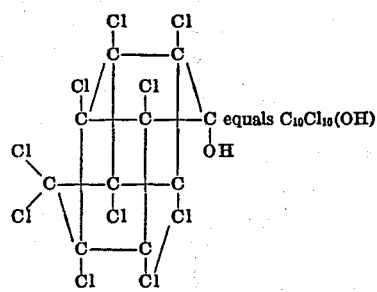

Among the many compounds intended to be included within the scope of this invention are the following compounds. Because of the unsettled and difficult nomenclature, the compounds are represented structurally rather than by names.

$C_{10}Cl_{10}(OH)$—NH—CHO
$C_{10}Cl_{10}(OH)$—NH—COCH$_3$
$C_{10}Cl_{10}(OH)$—NH—COCH$_2$CH$_3$
$C_{10}Cl_{10}(OH)$—NH—COCH=CH$_2$
$C_{10}Cl_{10}(OH)$—NH—COC$_{17}$H$_{35}$
$C_{10}Cl_{10}(OH)$—NH—COCH$_2$Cl
$C_{10}Cl_{10}(OH)$—NHCOCHOHCH$_3$
$C_{10}Cl_{10}(OH)$—NH—COCCl$_3$
$C_{10}Cl_{10}(OH)$NHCOCH$_2$CH$_2$CH$_2$CONH($C_{10}Cl_{10}(OH)$)

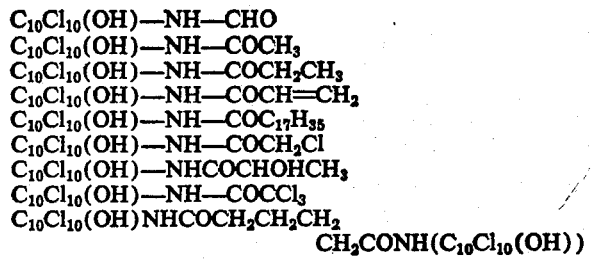

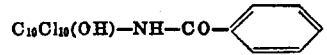

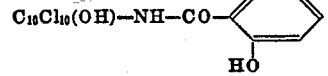

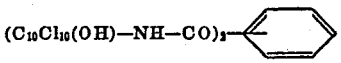

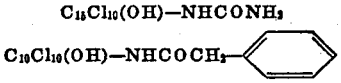

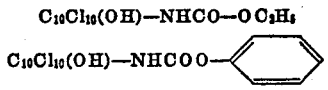

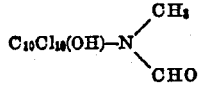

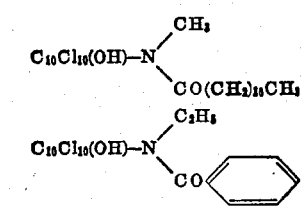

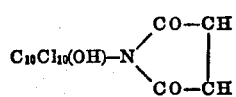

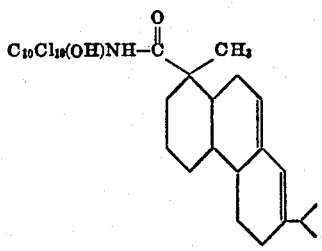

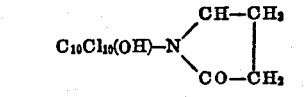

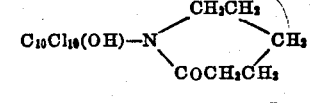

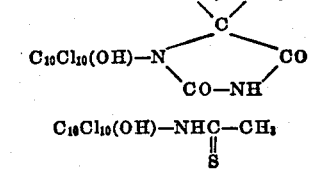

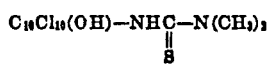

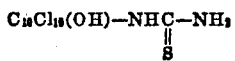

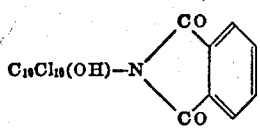

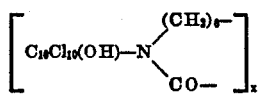

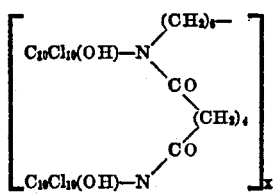

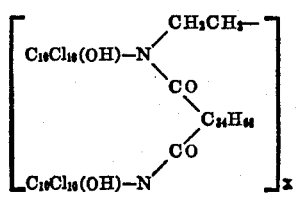

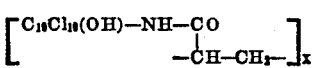

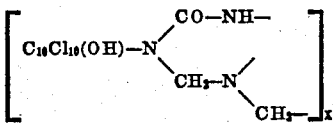

and related structures.

In the latter five structures $x$ represents the degree of polymerization, greater than one and with no upper limit. These macromolecular products of the invention may be made by the same general process as the lower moleculuar weight products, and are characterised by the same type of anti-fouling activity, while at the same time retaining certain of the desirable physical properties of the parent macromolecular compound, such as the ability to form films. Being resins, these products may serve not only as anti-fouling components of marine paints but also as film-forming or film-reinforcing ingredients.

The foregoing list of compounds is merely intended to be illustrative of the scope of this invention and is not in any sense intended to limit or define the invention.

While the causes of marine fouling are presently obscure, its effects on economic and military affairs is readily apparent. It is estimated that the cost of preventing, slowing down and treating marine fouling runs into millions of dollars annually, and no satisfactory solution is in sight. For example, the efficiency and the period of use of a pier, ship, boat, buoy or marine structure is greatly reduced unless some prophylactic treatment is followed.

Ships which have become encrusted with marine organisms lose a substantial part of their normal speed and mechanical efficiency. Furthermore, many ships and marine structures such as bulkheads, buoys, off-shore radar towers and oil drilling rigs and platforms once fouled are much more prone to become corroded or rotted. For this reason, an extensive and costly program of prophylaxis and maintenance is followed in an effort to cut down the even more expensive deleterious effects of the marine fouling.

The most common method of reducing the amount of the shell-like encrustation built up by the lower forms of marine life such as barnacles or other lower marine creatures is to paint the material to be protected with a special copper oxide based paint. However, the amount of copper oxide required adversely effects the physical characteristics of the paint and its normal life is reduced. In addition, the presence of a large quantity of copper oxide on a metal boat or ship will eventually create an electrolytic cell which greatly accelerates the tendency toward corrosion. To prevent this electrolytic corrosion the surface must first be covered by an additional and expensive coat of paint to insulate the copper oxide from the hull. But even when so protected, the hull of any ship or boat must be routinely scraped to remove the fouled surface which forms though albeit more slowly. Obviously too, this is expensive, since in addition to requiring costly and time-consuming dry-docking, scraping and repainting, the ship is removed from profitable use. For the above reasons, it can readily be seen that the discovery of compounds possessing anti-marine fouling properties at low concentrations is of extreme commercial and naval importance. While the mechanism by which the compounds of this invention retard marine fouling is not understood, it has been found that these compounds function well at economically feasible concentrations, are non-corrosive in themselves and being readily compatible with the oils, bases and adjuvants commonly used in paints can readily be formulated in marine paints and coatings in general.

While the compounds of this invention are advantageous as anti-marine fouling agents, they possess in addition other important advantages. For example, the novel compositions of this invention are useful as fire retardants and mildew retardants when formulated in organic coatings.

In addition, these compositions may be used as intermediates in the preparation of other anti-fouling compositions. Thus, when

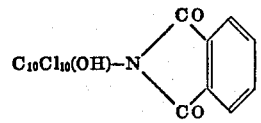

is heated with an excess of phthalimide, the product,

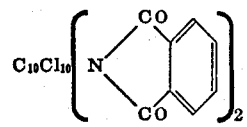

is produced. This compound also has activity as a marine anti-fouling substance.

A related but ancillary advantage that the compounds of this invention possess generally is that they are valuable intermediates for organic synthesis, in that the reactive and free OH group may be further replaced by

where R, R' and X have the same meaning as previously defined.

A further attribute that these compounds possess as synthetic intermediates is that in many instances they form complex addition compounds with water, amines, and even with additional moles of amide beyond the stoichiometrically combined amount. This characteristic is believed to be due to the ability of the —OH group to form a "hydrogen bond" with an electron-rich atom, particularly with a divalent oxygen atom or a trivalent nitrogen atom. For example, the product $$C_{10}Cl_{10}(OH)NHCHO$$

when dissolved in an excess of formamide, and the solution then poured into water, forms a more or less hydrated solid complex approximating to $$C_{10}Cl_{10}(OH)NHCHO.NH_2CHO.H_2O$$

A further characteristic of the new compounds of the invention is that they have weak acidic properties, perhaps due to the —OH group but also in some cases perhaps due to the —NH—CO— group. Regardless of the theoretical reasons, it has empirically been found that strong bases such as sodium methoxide, hydroxide, and the like can form salts with the compounds of the invention. Since the above mentioned salts and complexes can revert to the parent compounds of the invention, they constitute usable formulations for the purposes of anti-fouling coatings, a fact which we have empircally confirmed.

The novel compounds of this invention may be prepared by reacting hexachlorocyclopentadient with chlorosulfonic acid, then heating the intermediate that forms in an appropriate solvent with at least one molar equivalent of an amide or thioamide of the structure $$NHRC(=X)R'$$

The amide $NHR(C=X)R'$ may be added at the beginning of the heating, gradually during the heating, or after the heating has commenced for several hours. The rate and order of addition has not been found to be a critical feature of our process. It has also been found possible to employ polymeric compounds having a free and reactive structure $NHRC(=X)R'$ as reactants, for example, proteins, nylon, partially or fully hydrolyzed acrylonitrile polymers or copolymers and the polyurethanes. Starting with macromolecular amides, macromolecular products are obtained. It is not necessary to use a solvent for the reaction when the amide $NHRC(=X)R'$ is a liquid or low melting solid, but where the amide is not easily fused, a solvent is convenient. Appropriate solvents include but are not limited to chlorinated hydrocarbons, such as chlorobenzene or acetylene tetrachloride, aliphatic and aromatic compounds such as cyclohexane, xylene or toluene; ketones such as methyl ethyl and methyl propyl ketone, ethers such as diethyl, dipropyl, isobutyl, nitrohydrocarbons such as the nitrobenzenes, esters such as the lower alkyl acetates, N,N-dialkylamides such as dimethylformamide and acids such as formic acid. Where the $NHRC(=X)R'$ is a liquid the solvent may be dispensed with using an excess of the amide or thioamide instead. The temperatures needed to initiate and continue this reaction are not critical and vary considerably according to the reactants used. However, the extremes have been found to be from about zero degrees centigrade to two hundred degrees centigrade with a satisfactory range generally being between twenty degrees and one hundred and seventy-five degrees centigrade. Similarly, the time for the reaction to become complete, as measured by infra-red analysis, varies according to several factors such as temperature and reactants. Many reactions are completed in less than an hour, but others occasionally take as long as a day. The reaction may also be followed by checking the rate of $SO_2$ which is evolved, the reaction being halted when the flow of $SO_2$ has substantially ceased. A variation of the above process is to use a nitrile or imide capable of being hydrolyzed to the desired amide $NHR(C=X)R'$ plus at least the stoichiometric quantity of water required for said hydrolysis, the hydrolysis being run concurrently with the reaction of the invention. The structures of the products are proved by elemental analysis by infra-red spectra which shows the OH group absorption and the characteristic amide C=O or thioamide C=S bands. The presence of the pentacyclo-$(5.3.0.0^{2,6}.0^{4,10}.0^{5,9})$ decane skeleton is proved by fusion with several parts by weight of $PCl_5$ in a sealed tube at elevated temperatures, which yields the known dodecachloropentacyclo-$(5.3.0.0^{2,6}.0^{4,10}.0^{5,9})$ decane, melting point four hundred and eighty-five degrees. A more detailed discussion of the process and compositions produced is presented in the examples which follow.

*Example 1*

Preparation for $C_{10}Cl_{10}(OH)(NHCOCH_3)$

Hexachlorocyclopentadiene is reacted with chlorosulfonic acid as disclosed in U.S. Patent 2,516,404, an intermediate (described in said patent as $C_{10}H_2O_3SCl_{12}$), is formed which has a melting point of one hundred and forty-six to one hundred and forty-eight degrees centigrade. This intermediate is a definite chemical entity of melting point one hundred and forty-six to one hundred and forty-seven degrees and having a chlorine content of 67.8 percent and sulfur content of 5.09 percent. Because of its high molecular weight (six hundred and eleven to six hundred and thirty-nine) and difficult combustibility, the number of hydrogen atoms in the molecule is in doubt, and consequently its exact structure is uncertain. A solution of 62.8 parts by weight of this compound and 5.9 parts by weight of acetamide in one hundred and seventy-six parts by weight of xylene is refluxed for six hours until evolution of $SO_2$ had substantially dwindled. The solution is concentrated and the resultant crystalline product removed by filtration and dried in air. An infrared spectrum showed the compound to have an —OH group, an —NH group, and amide C=O group, and a methyl group.

*Analysis.*—Calcd. for $C_{10}Cl_{10}(OH)(NHCOCH_3)$: Cl, 64.5; N, 2.5. Found: Cl, 63.5; N, 2.5.

Upon heating the product for twenty-four hours at three hundred degrees centigrade with an excess of phosphorus pentachloride in a sealed tube, and evaporating the reaction mixture under vacuum at one hundred degrees centigrade, the volatile substances are removed leaving a crystalline substance which upon recrystallization, melts at four hundred and eighty-five degrees centigrade, which is the melting point of the expected and known derivative dodecachloropentacyclo-$(5.3.0.0^{2,6}.0^{4,10}.0^{5,9})$ decane, and has the correct percentage of chlorine for $C_{10}Cl_{12}$.

*Example 2*

Preparation of $C_{10}Cl_{10}(OH)(NHCHO).NH_2CHO$ Hydrate

One part by weight of the intermediate chlorosulfonation product of Example 1 melting at one hundred and forty-six to one hundred and forty-eight degrees centigrade is dissolved in ten parts by weight of formamide at one hundred degrees centigrade. After twenty-four hours at this temperature, the reaction mixture is cooled and poured into distilled water. The colorless crystalline product which precipitates out, is filtered off and air dried. Infra-red analysis shows the presence of the desired —OH, —NH and amide C=O groups, as well as an additional shoulder in the carbonyl region.

*Analysis.*—Calcd. for $$C_{10}Cl_{10}(OH)(NHCHO).NHCHO.H_2O$$

Cl, 59.7; N, 4.7. Found: Cl, 60.7; N, 4.5.

Example 3

C₁₀Cl₁₀(OH)(NCOCH₂CH₂CH₂CH₂CH₂CH₂) 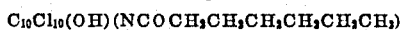

62.8 parts by weight of the product of hexachlorocyclopetadiene and ClSO₃H, melting at one hundred and forty-six to one hundred and forty-eight degrees centigrade, of Example 1, is refluxed one day with 11.3 parts by weight of 2-oxohexamethyleneimine(caprolactam) in one hundred and seventy-six parts of xylene. On cooling to room temperature, there precipitates a colorless crystalline material, the infrared spectrum of which shows —OH, lactam C=O, but no —NH, which is the spectrum one would expect for the desired product.

*Analysis.*—Calcd. for

C₁₀Cl₁₀(OH)(NCOCH₂CH₂CH₂CH₂CH₂CH₂) 

N, 4.0; Cl, 50.7. Found: N, 3.6; Cl, 48.6.

Example 4

Preparation of C₁₀Cl₁₀(OH)(NHCOC₆H₅)

In two hundred and sixty-four parts of xylene, 12.1 parts by weight of benzamide is reacted with 62.8 parts by weight of the crystalline C₅Cl₆/ClSO₃H product, melting at one hundred and forty-six to one hundred and forty-eight degrees. After four hours, the SO₂ evolution dwindles. On partial evaporation of the xylene and cooling, a colorless crystalline product is obtained whose infra-red spectrum showed —OH, —NH and amide C=O groups as well as C=C double bond vibrations characteristic of an aromatic ring.

*Analysis.*—Calcd. for C₁₀Cl₁₀(OH)(NHCOC₆H₅): Cl, 58.0; N, 2.3. Found: Cl, 57.9; N, 2.3.

It is found possible to titrate the product in acetone solution using tetrabutylammonium hydroxide (0.1–N) as the base. The end point occurs at the point where one molar equivalent of the base is added, showing that the C₁₀Cl₁₀(OH)NHCOC₆H₅ is a monobasic acid.

Example 5

Preparation of C₁₀Cl₁₀(OH)NHCOC₁₇H₃₅

A mixture of 62.2 parts of octadecylamide (ten percent molar excess), one hundred and twenty-five parts of the crystalline product of hexachlorocyclopentadiene and chlorosulfonic acid, and two hundred and twenty parts of dry xylene are heated at reflux for one day, until SO₂ evolution dwindled. The xylene is evaporated under water-aspirator vacuum and the waxy residue recrystallized from heptane and a white waxy solid is obtained, melting point seventy to seventy-five degrees.

*Analysis.*—Calcd. for C₂₈H₃₇O₂NCl₁₀: N, 1.8. Found: N, 1.9.

Example 6

Preparation of
C₁₀Cl₁₀(OH)NHCO(CH₂)₇CH=CH(CH₂)₇CH₃

As above, using 61.8 parts of oleamide (ten percent molar excess). The residue on evaporation of the xylene is a liquid and cannot be induced to crystallize.

The infra-red spectrum confirmed that the product has the C₁₀Cl₁₀(OH)NHCO(CH₂)₇CH=CH(CH₂)₇CH₃ structure.

Example 7

Preparation of C₁₀Cl₁₀(OH)N(COCH₃)C₆H₅

A mixture of 62.8 parts of the crystalline reaction product of C₅Cl₆ and ClSO₃H is heated with 13.5 parts of acetanilide in one hundred and eighty parts of xylene at reflux for six hours, until SO₂ evolution dwindles. Cooling to room temperature gives a crystalline precipitate, 30.5 parts by weight. Its infra-red spectrum shows the characteristic amide carbonyl band at six microns.

*Analysis.*—Calcd. for C₁₀C₁₀(OH)N(COCH₃)C₆H₅: Cl, 56.7. Found: Cl, 57.9.

Example 8

Preparation of C₁₀Cl₁₀(OH)NHCHO

A mixture of 31.3 parts of the crystalline reaction product of C₅Cl₆ and ClSO₃H in one hundred and seventy-six parts of xylene, mother liquor from a previous preparation of C₁₀Cl₁₀(OH)NHCHO, is refluxed for several hours, then while maintaining reflux, 9.0 parts of formamide is added and reflux continued for thirty hours. The mixture is then cooled to twenty to thirty degrees, and the resulting crystalline precipitate filtered off. The mother liquor is employed for a repeat run. The crystalline precipitate melts at three hundred and thirty-six degrees.

*Analysis.*—Calcd. for C₁₀Cl₁₀(OH)NHCHO: N, 2.6. Found: N, 2.6.

Example 9

Preparation of

C₁₀Cl₁₀(OH)NHCO—C=CH—CH=CH—O 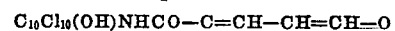

A mixture of 62.8 parts of the crystalline product of C₅Cl₆ and ClSO₃H and 26.8 parts of furamide in one hundred and seventy-six parts of xylene are refluxed for one day at the end of which time SO₂ evolution is negligible. On cooling, a dark amorphous precipitate is formed which is filtered and dried. The infra-red spectrum supports the C₁₀Cl₁₀(OH)NHCOC=CH—CH=CHO 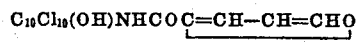

structure, although some complexed or entrained furamide appeared to be present. The product is used in the crude form.

*Analysis.*—Calcd. for

C₁₀Cl₁₀(OH)COC=CH—CH=CHO 

N, 3.7. Found: N, 4.2.

Example 10

Preparation of C₁₀Cl₁₀(OH)NHCOCH₂C₆H₅

A mixture of 62.8 parts of the crystalline product of C₅Cl₆ and ClSO₃H in one hundred and seventy-six parts of xylene is refluxed for one day with 13.5 parts of α-phenylacetamide. On cooling, a precipitate is obtained which, by infra-red, is established to have the desired C₁₀Cl₁₀(OH)NHCOCH₂C₆H₅ structure.

*Analysis.*—Calcd. for C₁₀Cl₁₀(OH)NHCOCH₂C₆H₅: N, 2.2. Found: N, 2.5.

Example 11

Preparation of C₁₀Cl₁₀(OH)—Substituted Polyamide

Thirty-one parts of the crystalline product of C₅Cl₆ and chlorosulfonic acid is pulverized with thirty parts of a commercial polyamide derived from ethylenediamine and a fatty dibasic acid C₃₄H₆₈(COOH)₂ and the mixture is heated at one hundred and forty to one hundred and fifty degrees for eighteen hours, at which time no further SO₂ was evolved. The product is cooled and the resulting resin is pulverized. The infra-red spectrum establishes the presence of the C₁₀Cl₁₀(OH)NRCOR′ structure.

Example 12

Preparation of Other Representative Compounds of This Invention

The chlorosulfonic acid intermediate of hexachlorocyclopentadiene melting at one hundred and forty-six to one hundred and forty-eight degrees centigrade is reacted with the appropriate amide as disclosed in the preceding examples. The following compounds are prepared (left hand column), in crude form. The right hand column gives the amides used.

| Compound | Derived From— |
|---|---|
| C₁₀Cl₁₀(OH)—NH—COCH=CH₂ | Acrylamide. |
| C₁₀Cl₁₀(OH)—NH—COCH₂Cl | Chloroacetamide. |
| C₁₀Cl₁₀(OH)—NHCOCHOHCH₃ | Lactamide. |
| C₁₀Cl₁₀(OH)—NH—COCCl₃ | Trichloroacetamide. |
| C₁₀Cl₁₀(OH)NHCOCH₂CH₂CH₂CH₂CONH(C₁₀Cl₁₀(OH)) | Adipamide. |
| C₁₀Cl₁₀(OH)—NH—CO—C₆H₄—OH | Salicylamide. |
| (C₁₀Cl₁₀(OH)—NH—CO)₂—C₆H₄ | Phthalamides. |
| C₁₀Cl₁₀(OH)—NHCONH₂ | Carbamide. |
| C₁₀Cl₁₀(OH)—NHCO—OC₂H₅ | Ethyl urethane. |
| C₁₀Cl₁₀(OH)—NHCOO—C₆H₅ | Phenyl urethane. |
| C₁₀Cl₁₀(OH)—N(CH₃)(CHO) | N-methylformamide. |
| C₁₀Cl₁₀(OH)—N(CH₃)(CO(CH₂)₁₆CH₃) | N-methylstearamide. |
| C₁₀Cl₁₀(OH)—N(C₂H₅)(CO—C₆H₅) | N-ethylbenzamide. |
| C₁₀Cl₁₀(OH)—N(CO—CH=CO—CH) (maleimide ring) | Maleimide. |
| C₁₀Cl₁₀(OH)NH—CO—(abietyl) | Abietamide.[1] |
| C₁₀Cl₁₀(OH)—N(CO—CH₂)(CO—CH₂) | Succinimide. |
| C₁₀Cl₁₀(OH)—N(C(CH₃)₂—CO)(CO—NH) | Dimethylhydantoin. |
| C₁₀Cl₁₀(OH)—N(CO)(CO)—C₆H₄ | Phthalimide. |
| [C₁₀Cl₁₀(OH)—N((CH₂)₅—CO—)]ₓ | "Nylon 6." |
| [C₁₀Cl₁₀(OH)—N((CH₂)₆—)(CO—(CH₂)₄—CO—)C₁₀Cl₁₀(OH)—N]ₓ | Do. |

| Compound | Derived From— |
|---|---|
| $[C_{10}Cl_{10}(OH)-N\diagdown_{CH_2-N\diagdown_{CH_2-}}^{CO-NH-\diagup CH_2-\diagup}]_x$ | Urea formaldehyde resins. |

[1] Also other rosin amides yield analogous products.

and related structures.

Example 13

Formulation of Marine Paint Having Antifouling Properties

The following ingredients are blended and ground together in a ball mill.

| Ingredient: | Pounds per 100 gallons |
|---|---|
| Gum rosin, grade WW | 277 |
| Blown fish oil | 118 |
| Zinc stearate | 18 |
| Versamide polyamide adduct of Example 11 | 197 |
| Zinc oxide | 161 |
| Magnesium silicate | 56 |
| Solvent naphtha, approximately | [1] 241 |
| Lampblack | 1 |

[1] Volume adjusted to 100 gal. by addition of naphtha.

Example 14

Formulation of Marine Paint Having Antifouling Properties

The following ingredients are blended and ground together in a ball mill.

| Ingredient: | Pound per 100 gallons |
|---|---|
| Rosin | 311 |
| Hydrogenated methyl abietate | 115.5 |
| Coal tar naphtha | 92.4 |
| Mineral spirits (paint thinner), approximately | [2] 103.7 |
| Diatomaceous silica | 103.7 |
| $C_{10}Cl_{10}(OH)NHCOC_6H_5$ | 311 |
| Lampblack | 1.0 |

[2] Volume adjusted to 100 gal. by addition of naphtha.

Example 15

Formulation of Marine Paint Having Antifouling Properties

As above, using in place of $C_{10}Cl_{10}(OH)NHCOC_6H_5$ the product of $C_{10}Cl_{10}(OH)NHCHO\cdot NH_2CHO$ hydrate of Example 2.

Example 16

Formulation of Marine Paint Having Antifouling Properties

The following ingredients are blended together in the indicated proportions, in a ball mill.

| Ingredient: | Pounds per 100 gallons |
|---|---|
| Rosin | 265 |
| Coal tar | 80 |
| Talc | 80 |
| Pine oil | 42 |
| $C_{10}Cl_{10}(OH)(NHCOCH_3)$ from Example 1 | 200 |
| High flash naphtha | 135 |
| Mineral spirits | (3) |

[3] Make up to volume.

Example 17

Another Formulation of Marine Paint Having Antifouling Properties

The following ingredients are blended together in the denoted proportions, in a roller mill.

| Ingredient: | Percent by weight |
|---|---|
| Chlorinated rubber (Parlon S-125) | 2.5 |
| Rosin | 20.00 |
| Dibutyl phthalate | 0.30 |
| Titanium dioxide pigment | 21.65 |
| Zinc oxide | 8.55 |
| Cobalt naphthenate | 0.05 |
| Lead naphthenate | 0.19 |
| Phenoxypropylene oxide | 0.13 |
| $C_{10}Cl_{10}(OH)NCOC_{17}H_{35}$—from Example 5 | 5.00 |
| Xylene | (4) |

[4] Remainder.

Example 18

Testing of Paint Formulations of the Preceding Examples for Antifouling Properties The formulations disclosed in the preceding examples are painted on steel test panels, allowed to dry and immersed in sea water at a sub-tropical location. At the same time other identical panels are painted with control test formulations identical with these paint preparations except that the N-decachlorohydroxypentacyclodecylamide derivatives are omitted from the formulation. These test panels are immersed in the same sub-tropical sea water. After one month both the control test panels and the panels containing the active component are examined and compared. It is found that the control panels are heavily crusted with a mixed population of barnacles and other marine organisms, while the panels containing the active anti-marine fouling component were not adversely affected.

Example 19

Testing of Anti-Marine Fouling Properties of Different Products of This Invention To eliminate variables due to the other ingredients in the paint formulations a simplified comparison test is carried out by treating porous test panels with a number of the products of this invention applied as a three percent solution of methyl isobutyl ketone. The panels are allowed to dry and are then immersed in sea water at a sub-tropical location where untreated test panels became heavily fouled during the test interval. After a one month period the degree of fouling control was observed according to the amounts of fouling organisms found on the treated panel surface compared to identical untreated panels. The results are recorded on Table I below.

TABLE I.—PERCENT CONTROL OF FOULING BY INDICATED ORGANISMS

| Compound | Algae | Amphipods | Annelida | Barnacles | Bryozoa | Hydroids | Mollusks | Tunicates | Microfouling |
|---|---|---|---|---|---|---|---|---|---|
| $C_{10}Cl_{10}(OH)(NHCHO)$ | 100 | 100 | 100 | 100 | 100 | 100 | 100 | 100 | 100 |
| $C_{10}Cl_{10}(OH)(NHCOCH_3)$ | 100 | 100 | 100 | 95 | 100 | 100 | 100 | 100 | 100 |
| $C_{10}Cl_{10}(OH)(NHCOC_6H_5)$ | 100 | 100 | 100 | 100 | 100 | 100 | 100 | 100 | 100 |
| $C_{10}Cl_{10}(OH)(NHCOCH_2C_6H_5)$ | 50 | 100 | 100 | 100 | 100 | 100 | 100 | 100 | 90 |
| $C_{10}Cl_{10}(OH)(NHCONH_2)$ | 0 | 0 | 20 | 0 | 0 | 50 | 100 | 50 | 0 |
| $C_{10}Cl_{10}(OH)$[N(CO)_2C_6H_4] (phthalimide) | 100 | 100 | 100 | 100 | 95 | 100 | 100 | 100 | 100 |
| $C_{10}Cl_{10}(OH)NHCO$-(furyl) | 100 | 100 | 50 | 0 | 0 | 70 | 100 | 0 | 70 |

What is claimed is:

1. An anti-fouling marine paint comprising paint constituents and containing as an active component thereof an anti-fouling proportion of

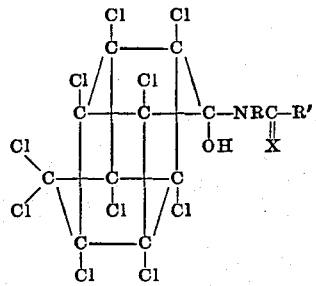

where R is selected from the group consisting of hydrogen, unsubstituted alkyl, substituted alkyl, unsubstituted aryl, substituted aryl and organocyclic conjoined to R', R' is selected from the group consisting of hydrogen, unsubstituted alkyl, substituted alkyl, unsubstituted aryl, substituted aryl, amino, substituted amino, alkoxy, aryloxy, alkylene, substituted alkylene and organocyclic conjoined to R, and X is selected from the group consisting of sulfur and oxygen, together with a resin selected from the group consisting of rosin and chlorinated rubber, and a paint thinner.

2. An anti-fouling marine paint according to claim 1, wherein the active component is a polymer of

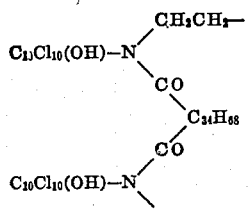

3. An anti-fouling marine paint according to claim 1 wherein in the formula, the repeating unit of which is the active component R is hydrogen and R' is phenyl.

4. An anti-fouling marine paint according to claim 1 wherein in the formula of the active component R is hydrogen and R' is hydrogen and the active component is in the form of the $NH_2CHO$ hydrate.

5. An anti-fouling marine paint according to claim 1 wherein in the formula of the active component R is hydrogen and R' is $C_{17}H_{35}$.

6. An anti-fouling marine paint according to claim 1 wherein in the formula of the active component R and R' are both hydrogen.

7. An anti-fouling marine paint according to claim 1 wherein in the formula of the active component R is hydrogen and R' is benzyl.

8. An anti-fouling marine paint according to claim 1 wherein in the formula of the active component R and R' are the same

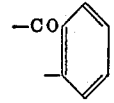

conjoined.

9. An anti-fouling marine paint comprising rosin, oil, paint thinner and, as an active component thereof, an anti-fouling proportion of

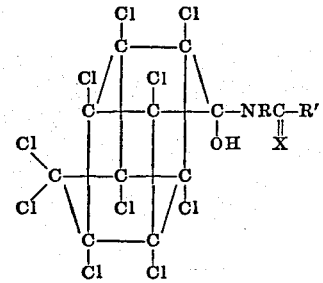

wherein R is selected from the group consisting of hydrogen, unsubstituted alkyl, substituted alkyl, unsubstituted aryl, substituted aryl, and organocyclic conjoined to R', R' is selected from the group consisting hydrogen, unsubstituted alkyl, substituted alkyl, unsubstituted aryl, substituted aryl, amino, substituted amino, alkoxy, aryloxy, alkylene, substituted alkylene and organocyclic conjoined to R, and X is selected from the group consisting of sulfur and oxygen.

10. An anti-fouling marine paint, in accordance with claim 9 wherein the oil is fish oil and the thinner is selected from the group consisting of naphtha, mineral spirits and xylene.

No references cited.

ALEXANDER H. BRODMERKEL, *Primary Examiner.*

DONALD J. ARNOLD, *Examiner.*

L. B. HAYES, *Assistant Examiner.*

UNITED STATES PATENT OFFICE
CERTIFICATE OF CORRECTION

Patent No. 3,347,686            October 17, 1967

Edward D. Weil et al.

It is certified that error appears in the above identified patent and that said Letters Patent are hereby corrected as shown below:

Column 2, line 21, for that portion of the formula reading "$C_{15}$" should read -- $C_{10}$ --. Column 5, line 31, "hexachlorocyclopentadient" should read -- hexachlorocyclopentadiene --. Column 7, line 2, before the formula, insert -- Preparation of --; line 5, "petadiene" should read -- pentadiene --; line 74, that portion of the formula reading "$C_{10}C_{10}$" should read -- $C_{10}Cl_{10}$ --.

Signed and sealed this 10th day of March 1970.

(SEAL)
Attest:

Edward M. Fletcher, Jr.          WILLIAM E. SCHUYLER, JR.
Attesting Officer               Commissioner of Patents